B. JENNINGS.
PIPE-JOINT.

No. 170,476. Patented Nov. 30, 1875.

Witnesses:
Edw. W. Down
Alexander Scott

Inventor
Byron Jennings
Munson & Philipp
his attorneys

N. PETERS, PHOTO-LITHOGRAPHER, WASHINGTON, D.C.

UNITED STATES PATENT OFFICE.

BYRON JENNINGS, OF SAN JOSÉ, CALIFORNIA.

IMPROVEMENT IN PIPE-JOINTS.

Specification forming part of Letters Patent No. 170,476, dated November 30, 1875; application filed April 11, 1874.

*To all whom it may concern:*

Be it known that I, BYRON JENNINGS, of the city of San José, county of Santa Clara and State of California, have invented certain Improvements in Pipe-Joints, of which the following is a specification:

The object of my invention is to connect or join the ends of lengths of wrought-metal pipes, so as to form a perfect and secure connection between the same; and it consists in the means more particularly hereinafter pointed out and claimed.

Figure 1:
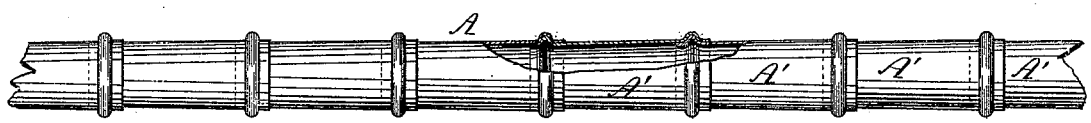
Figure 2:
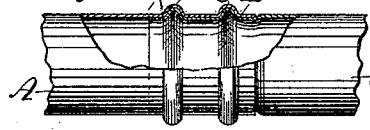
Figure 3:
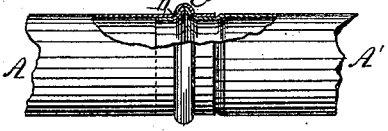
Figure 4:
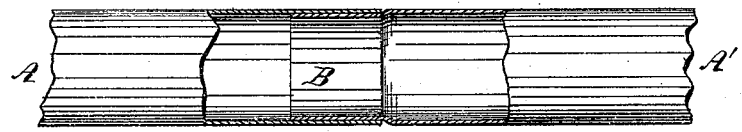

In the drawing accompanying this specification, and forming a part of the same, Figure 1 is a plan view, partly in section, showing several lengths of pipe united by the means constituting my invention. Fig. 2 is a plan view, partly in section, showing the joint when two corrugations are employed. Fig. 3 is a plan view, partly in section, showing the joint when one corrugation is employed. Fig. 4 is a plan view, partly in section, showing the pipes in position ready to have the corrugations simultaneously made in both pipes.

A represents the outer pipe, having corrugations C C formed therein by swaging, or by any of the well-known methods in common use. A' is the inner pipe, one end of which, B, is inserted in the end of pipe A, and which is provided with corrugations D D, which are swaged into the corrugations C C of said pipe A. The corrugations C C and D D may be made in the pipes A and A' simultaneously after the end B of the latter is placed in the end of the former, as shown in Fig. 4. By this means a perfect and secure joint is provided. This joint may be packed by the use of lead or any other suitable substance for the purpose, which may be placed in the corrugations C C in the pipe A before the corrugations D D are made in the pipe A', or between the pipes A and A' when the corrugations C C and D D are made simultaneously.

Although I show two corrugations, one will, for some purposes, answer, and more than two may be employed when deemed expedient.

Having thus described my invention, what I claim as new, and desire to secure by Letters Patent, is—

The combination of the pipes A and A', the former provided with corrugations C C, and the latter with corrugations D D, forced into the corrugations C C, for the purpose of forming a joint, substantially as shown and described.

BYRON JENNINGS.

Witnesses:
EDWARD HALSEY,
D. M. SMITH.